United States Patent Office 3,450,518
Patented June 17, 1969

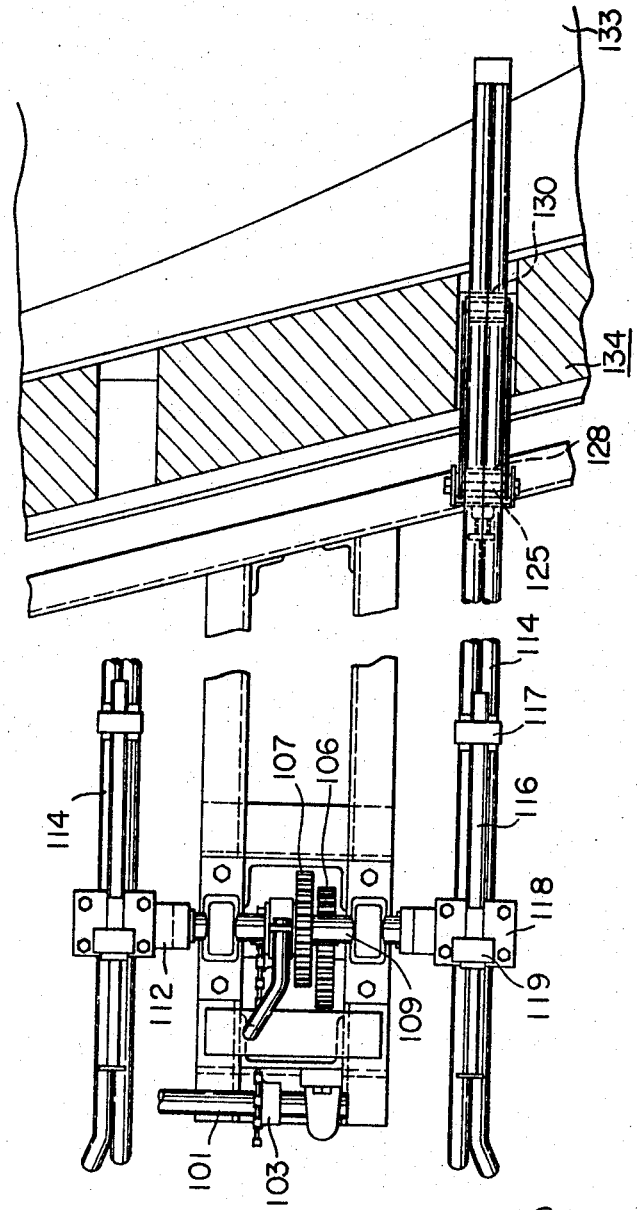

3,450,518
APPARATUS FOR STRETCHING MOLTEN SHEET GLASS LATERALLY
Kiyoshi Itakura and Hideaki Takigawa, Kobe, Japan, assignors to Nippon Sheet Glass Co., Ltd., Osaka, Japan
Filed Feb. 28, 1966, Ser. No. 530,662
Claims priority, application Japan, Mar. 9, 1965, 40/13,219
Int. Cl. C03b *18/02*
U.S. Cl. 65—182                                 3 Claims

ABSTRACT OF THE DISCLOSURE

An apparatus and method for manufacturing sheet glass by stretching molten sheet glass laterally on the surface of a bath of molten metal. The sheet of molten glass delivered to the surface of the molten metal bath in a continuous ribbon and forwarded along the surface of the bath is grasped from both sides of the molten metal bath by grasping means which positively extend the width of the glass to a width greater than if the glass were allowed to flow under the effect of gravity. The grasping means can be hooking members which are given a periodic motion in the lateral direction of the ribbon.

---

This invention concerns the manufacture of sheet glass, and particularly relates to the manufacture of thin sheet glass by a continuous sheet glass making method using a bath of molten metal.

It has hitherto been difficult to produce relatively thin sheet glass by such a method. When a glass ribbon of a certain definite thickness is manufactured by causing molten glass to flow freely on a bath of molten metal and spread in a thin layer, there is a limit to the thickness of the drawn glass owing to the temperature of the molten metal bath and molten glass and the surface tension thereof, and it is no easy task to get a thin glass sheet.

It has now been found that in the manufacture of sheet glass by feeding molten glass continuously from a glass melting furnace onto a bath of molten metal at a controlled rate and forming a layer of the molten glass into a continuous ribbon while floating it on the said bath, if the width of the ribbon of molten glass is positively enlarged by exerting an outwardly directed mechanical force simultaneously on the both side edge portions of the molten glass ribbon, a thinner sheet glass of good quality can be obtained. It has also been found that the thin sheet glass obtained in accordance with this invention is superior in that it has less distortions than the product obtained by the prior art.

In the practice of the method of this invention, there is provided on both sides of the said molten metal bath at least one pair of stretching means which act on the side edge portions of the said glass ribbon and thus enlarge the width thereof positively while the molten glass ribbon is moving foward on the bath of molten metal and the glass is still capable of being deformed.

The widthwise drawing of the glass ribbon can be carried out by catching the edge of a glass ribbon by a hook which extends through the upper side wall of the bath and carries out a periodical hooking motion.

The invention will now be described with reference to the accompanying drawings, in which:

FIG. 6 is a top plan view of the apparatus of FIG. 4 partly in section;

FIGS. 7*a*–*c* and 8*a*–*c* are side, front and top views, respectively, of hooking members suitable for use in accordance with the invention.

Figure 1:
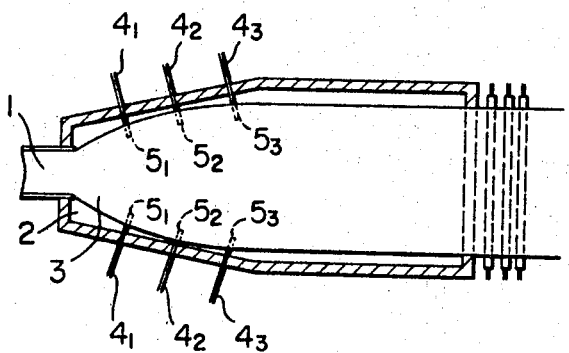
FIG. 1 is a diagrammatic plan view showing the method of the invention wherein a stretching means comprising rotary members is used.

In FIG. 1, the molten glass in a glass melting furnace is poured onto a molten metal bath 2 through a passage 1 at a controlled rate. The molten glass spreads naturally over the bath of molten metal in a fluid state and forms a glass ribbon 3, which goes forward afloat on the surface of the bath.

A first member 51, catches the face of edge portions at both sides of the glass ribbon, exerts an outward pulling force and draws the glass ribbon.

Figure 2:
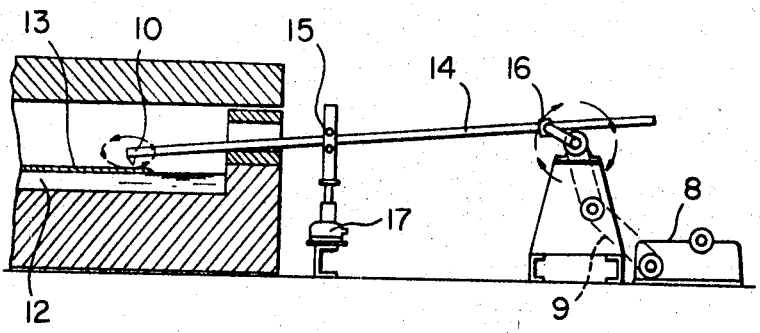
FIG. 2 is a side view illustrating the action of stretching means comprising hooks.
Figure 3:
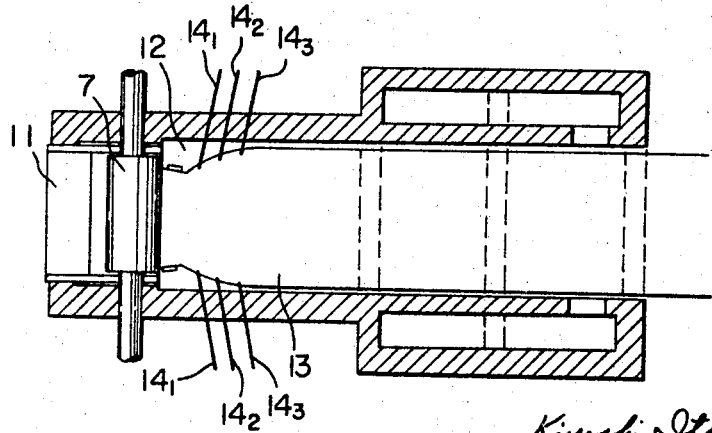
FIG. 3 is a diagrammatic plan view illustrating the method of this invention wherein the stretching means of FIG. 2 is used.

The outward pulling force can be exerted by means of a hook (cf. FIG. 2) which effects a periodic hooking action. As shown in FIG. 3, molten glass 11 at 1150–1300° C. is conveyed from a forehearth of the melting furnace, flows down along a lip tile, and to a rolling means consisting of a water-cooled metal roll 7 and a molten metal bath 12. An upwardly and downwardly moving damper is provided to adjust the amount of the flowing glass. The glass conveyed to the rolling means is buoyant owing to the difference of specific gravity between the molten metal and the glass, and by a downwardly directed pressure caused by a roll 7, the glass is continuously rolled. The tip of the first hook 14, is thrust into the edge portion of the rolled glass ribbon, and pulls the glass ribbon outwardly. A reciprocal motion producing apparatus for driving the hook is shown in FIG. 2. A lever 14 carrying the hook is supported at a fulcrum 15. One end of the hook is associated with a crank pin 16, and the shaft of the crank pin 16 is connected to a geared motor 8 via a chain 9, and is rotated thereby. With the rotation of the crank in the direction of the arrows, the tip 10 of the hook moves as shown by arrows. By a change of the position of the fulcrum 15, the rotating locus of the tip 10 of the hook can be changed freely. A suitable rate of pulling is 10–100 times per minute, and varies according to the speed of the progress of the glass ribbon. The glass ribbon drawn by the first hook $14_1$, is further drawn outwardly by a second hook $14_2$. In sequence, the edge portions at both sides of the glass ribbon are likewise caught by a hook and extended. The glass ribbon drawn to the desired thickness moves along the bath of molten metal, and is cooled and congealed.

The hook is suitable for use at a relatively high glass ribbon temperature (e.g., 930–1200° C.). Hence, it is desirable that a hook should be used for high temperature glass ribbon in an early stage of stretching.

This invention makes it possible to easily manufacture a transparent sheet glass of less than 3 mm. thickness, the production of which was hitherto regarded as being difficult. In accordance with this invention, irregularities in the thickness are rectified when the glass ribbon is drawn. Being at a high temperature, the thicker portions are extended to a greater degree and the overall thickness of the sheet becomes uniform. As there is no necessity of raising the temperature of the molten metal bath above that of the glass ribbon, the cost of fuel necessary for heating can be reduced, and there is also the advantage that the length of the bath can be shortened.

Figure 4:
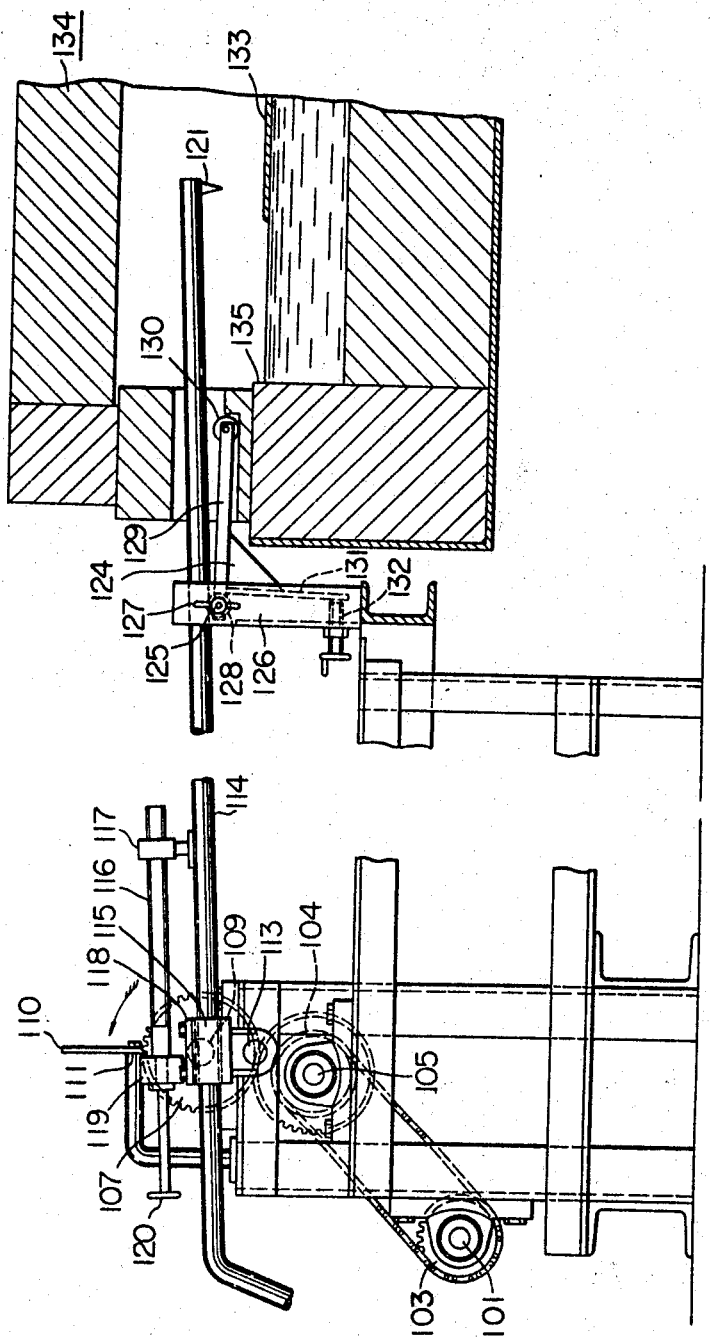
FIG. 4 is a side view, partially in section, taken along the transverse section of the bath, of one example of the stretching means comprising hooks.
Figure 5:
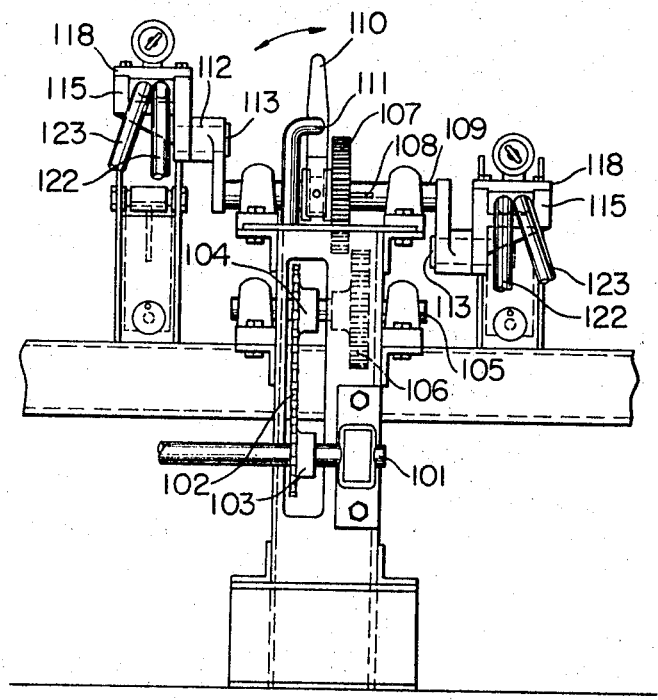
FIG. 5 is a front view of the stretching means taken from the left in FIG. 4.
Figure 8C:
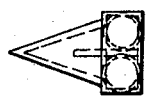

In the apparatus shown in FIGS. 4–6, a driving shaft 101 is connected to a geared motor (not shown in the drawings). The rotation of the driving shaft 101 is transmitted to an intermediate shaft 105 by a chain 102 and chain wheels 103 and 104. To the intermediate shaft 105 is secured a gear 106, and a clutch gear 107 can engage the gear 106. The clutch gear 107 is fitted on a crank shaft 109 by means of an inlaid key 108, but is capable of sliding on the crank shaft 109 in an axial direction. By actuating a clutch handle 110 around a fulcrum 111 in the direction of the arrows shown in FIG. 6, it is possible to cause the gear 106 to engage with or disengage from the clutch gear 107. When the gear 106 and the clutch gear 107 are in engagement, the rotation of the driving shaft 101 is transmitted to the crank shaft 109, and a crank arm 112 moves circularly around the shaft 109. The crank arm 112 has a receiving case 115 for the hooking lever 114 mounted on a pin 113. A threaded rod 116 for adjusting the effective length of the hooking lever engages a female screw threaded member 117 fixed to the hooking lever 114. The threaded rod 116 is mounted rotatably on bearing 119 mounted on the lid 118 of the receiving case 115. Thus, when the handle 20 of the threaded rod 116 is rotated, the hooking lever 114 goes forward and backward through the case 115. In this manner, it is possible to preadjust the position at which the hook 121 is thrust into the glass ribbon on the metal bath. The hooking lever 114 is hollow inside and is internally cooled by water introduced through a cooling water inlet 122 and which flows to a cooling water outlet 123.

In one embodiment of this invention, the hooking lever 114 is slidably supported by at least one supporting means between the center part of its length and the end to which a hook 121 is affixed. The said supporting means is placed in a position such that the hooking lever 114 can convert a circular motion given to one end into a predetermined periodic motion of the hook 121. When the supporting means is a single means, the motion of the hook 121 is an elliptical motion. In a preferred embodiment, two or more of said supporting means is provided, and the hooking lever 114 is so designed that it may be operated while being supported always by at least one supporting means.

In the embodiment shown in FIGS. 4–6, the motion of the hook 121 is predetermined by an L-shaped fitting 124 which is secured on a stand 126 by a supporting shaft 125. The stand 126 has provided therein a groove 127, and by this, the level of the supporting shaft 125 can be preadjusted. A rotatable roller 128 mounted concentrically on the shaft 125 acts as a first supporting means. To the tip of a horizontally extending arm 129 of the L-shaped fitting is also secured a roller 130 which acts as a second supporting means. There is a small amount of friction when the hooking lever 114 slides while being supported by at least one of rolls 128 and 130. The other arm 131 of the L-shaped fitting 124 extends downwardly and contacts a jack bolt 132. By operating the jack bolt 132, it is possible to preadjust the level of the roller 130.

Figure 7C:
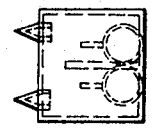
Figures 8A, 8B:
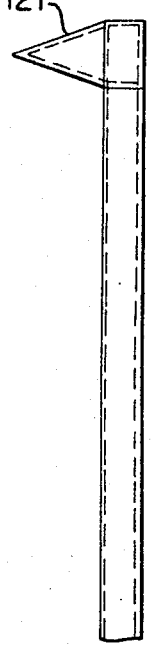
Figures 7A, 7B:
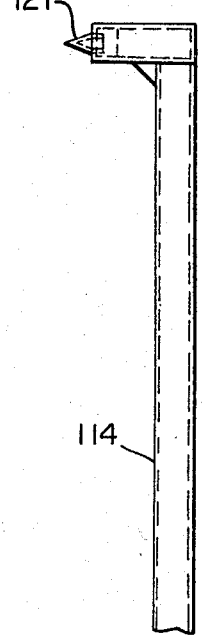

The hooking lever 114 is rotated together with the receiving case 115 with the pin 113 acting as a fulcrum, and, while being supported by at least one of the rollers 128 and 130, slides thereon. The crank shaft 109 is rotated in the direction of the arrow in FIG. 5 (counterclockwise) so that the hook 121 will catch one side edge of the molten glass ribbon 133 and pull it in the direction toward the side wall 135 of a molten metal bath tub 134. In response to the rotation of the crank shaft 109, the crank arm 112 rotates, and rotating on the pin 113, the receiving case 115 moves circularly while hardly changing its posture. Thus, a circular motion is given to one end of the hooking lever 114. The position and level of the rollers 128 and 130 are adjusted in advance so that, when the hooking lever 114 retreats, it will slide over the roller 130 while being supported thereby. The depth into the molten glass ribbon 133 which the hook 121 engages can be controlled by adjusting the height of the rollers 128 and 130 in advance. In this preferred embodiment wherein two supporting means are used, the motion of the hook 121 is a relatively flat elliptical motion when the hook 121 is away from the glass ribbon; that is, when the hooking lever 114 is being supported by the roller 128, whereas it is an elliptical motion close to a straight line motion when the hook 121 comes in contact with the glass ribbon, that is, when the hooking lever 114 is being supported by the roller 130. It is very preferable to confine the motion of the hook 121 to roughly a straight line motion when the hook is acting on the molten glass ribbon. The provision of three or more supporting means would make is possible to render the motion of the hook 121 more smooth. An example of an appropriate structure of the hook 121 is shown in FIGS. 7a–c and FIGS. 8a–c. The hook as shown in FIGS. 7a–c sinks into the glass ribbon to a lesser degree.

The hooking member can be manufactured of a refractory material such as boron nitride, silicon nitride, graphite and the like. When internal cooling is carried out, it is found that a material made by calorising the surface of a mild steel is durable.

We claim:

1. In an apparatus for manufacturing a sheet glass, said apparatus having a bath of molten metal for receiving on the surface thereof molten glass delivered from a glass melting furnace at a controlled rate and forming it into a continuous ribbon while forwarding it over the surface of the molten metal, the improvement comprising at least one hooking member on each side of said bath of molten metal having a hook thereon for catching one side edge portion of the ribbon of molten glass, a reciprocal motion producing device on each side of said bath and producing reciprocal motion in a horizontal and a vertical direction transverse to the direction of the length of said bath, said devices being connected to the respective hooking members to exert thereon a mechanical force to pull the ribbon in the direction of its width, and a driving means coupled to the reciprocal motion producing device and giving a predetermined periodic motion to the said hooking member in the direction of the width of the ribbon of glass and transversely thereof.

2. The improvement as claimed in claim 1 wherein said hooking member comprises a long rigid motion transmitting member having the hook affixed thereto at one end, and said reciprocal motion producing device comprises a means for giving a circular motion within a substantially vertical plane transverse to the length of the bath to the other end of the said motion transmitting member and at least one supporting means slidably supporting the said motion transmitting member between its center part along its length and the end portion to which the hook is affixed.

3. The improvement as claimed in claim 1 wherein said hooking member comprises a long rigid motion transmitting member having a hook affixed thereto at one end, and said reciprocal motion producing device comprises a means for giving a circular motion within a substantially vertical plane transverse to the length of the bath to the other end of the said motion transmitting member and at least two supporting means slidably supporting the said motion transmitting member, at least one of said supporting means being between the center part along the length of the motion transmitting member and the end portion to which the hook is affixed.

References Cited

UNITED STATES PATENTS

| | | | |
|---|---|---|---|
| 1,639,452 | 8/1927 | Drake | 65—91 |
| 1,761,234 | 6/1930 | Rowley | 65—91 |
| 3,222,154 | 12/1965 | Pilkington | 65—91 |
| 3,353,943 | 11/1967 | Loutte | 65—182 |

S. LEON BASHORE, Primary Examiner.

R. V. FISHER, Assistant Examiner.

U.S. Cl. X.R.

65—65, 99, 199